United States Patent [19]
Stern

[11] 3,728,894
[45] Apr. 24, 1973

[54] FLUIDIC GAGING DEVICE

[75] Inventor: HansJoerg Stern, Scotia, N.Y.

[73] Assignee: General Electric Company New York, N.Y.

[22] Filed: Apr. 2, 1971

[21] Appl. No.: 130,635

Related U.S. Application Data

[63] Continuation of Ser. No. 800,623, Feb. 19, 1969, abandoned.

[52] U.S. Cl. .................................................73/37.5
[51] Int. Cl. ............................................G01b 13/04
[58] Field of Search................73/37.5, 37.6, 37.7, 73/37.8

[56] References Cited

UNITED STATES PATENTS

| | | | |
|---|---|---|---|
| 2,266,566 | 12/1941 | Poole | 73/37.5 |
| 2,390,252 | 12/1945 | Hayward | 73/37.5 |
| 2,407,100 | 9/1946 | Richardson | 73/37.7 |
| 2,560,883 | 7/1951 | Mennesson | 73/37.7 |
| 3,116,478 | 12/1963 | Powell | 73/37.5 |
| 3,171,275 | 3/1965 | Miller | 73/37.5 |
| 3,353,402 | 11/1967 | Caliqiuri | 73/37.5 |
| 3,435,673 | 4/1969 | Felix | 73/37.7 |
| 3,438,744 | 4/1969 | Plumpe, Jr. | 73/37.5 |
| 3,477,276 | 11/1969 | Fortier | 73/37.5 |
| 3,485,095 | 12/1969 | Hirata | 73/37.7 |

FOREIGN PATENTS OR APPLICATIONS

| | | | |
|---|---|---|---|
| 379,827 | 8/1923 | Germany | 73/37.5 |
| 946,518 | 1/1964 | Great Britain | 73/37.5 |

Primary Examiner—S. Clement Swisher
Attorney—Philip L. Schlamp, David M. Schiller and Arthur E. Fournier

[57] ABSTRACT

A fluidic gage having no moving mechanical parts is utilized for continuous monitoring of a particular parameter such as wire diameter, sliver density and object proximity. The gage comprises a bridge circuit including a pair of fluidic resistors having fixed resistances to fluid flow therethrough and a first fluidic variable resistor in three legs of the bridge circuit. A sensing head is connected in the fourth leg of the bridge circuit in fluid communication with the monitored material to function as a second fluidic variable resistor. The first variable resistor is preset to a predetermined resistance value corresponding to a desired value of the monitored parameter. Deviation from the desired value of the monitored parameter causes a linear change in fluid pressure at the input to the sensing head thereby causing an unbalanced condition of the bridge circuit and developing a pressurized fluid signal which may be utilized for operating a suitable readout device or initiating a control action.

35 Claims, 8 Drawing Figures

PATENTED APR 24 1973 3,728,894
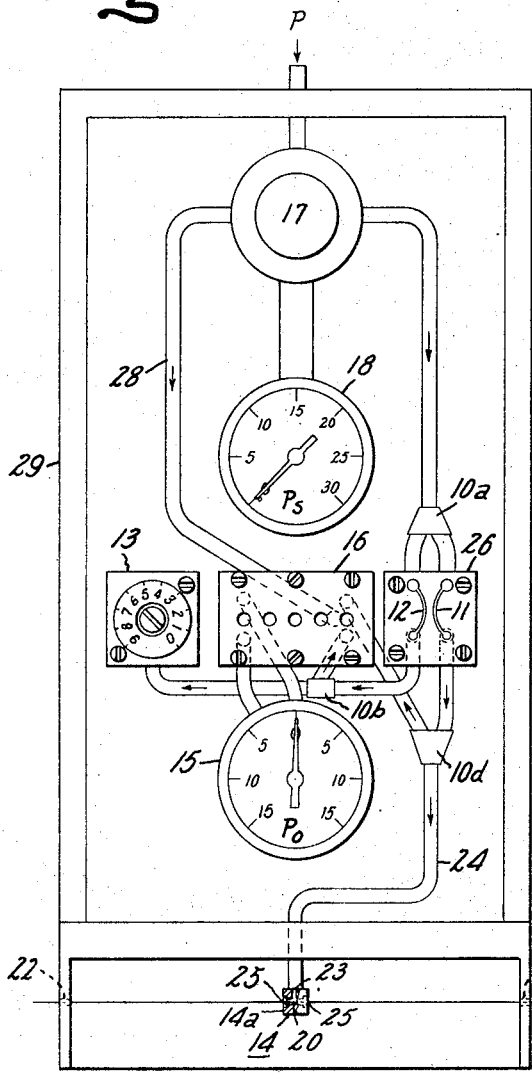
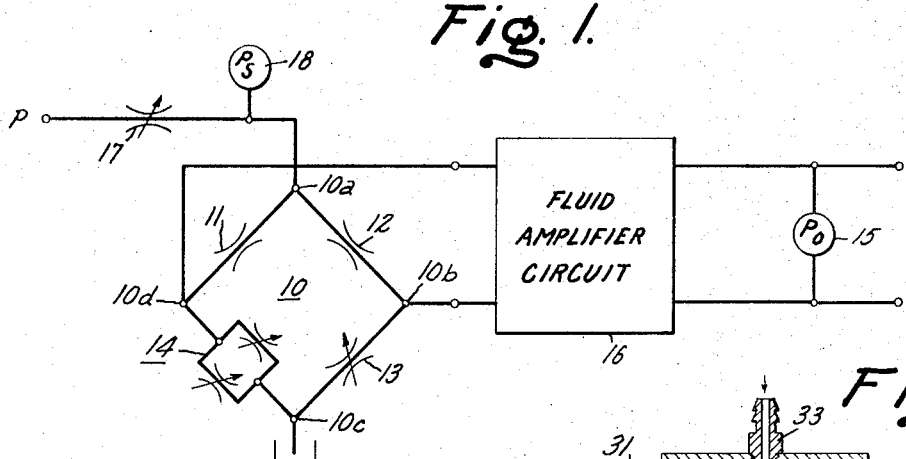
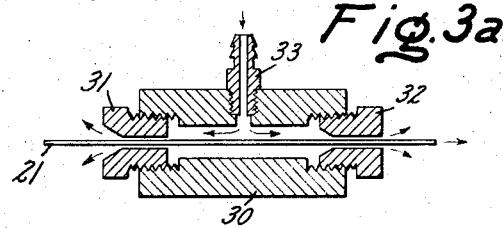
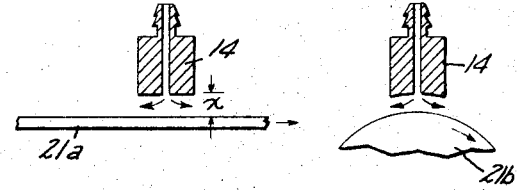
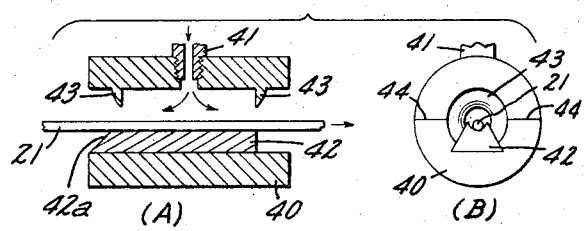
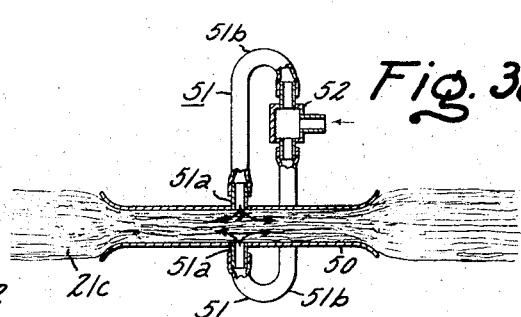
Inventor:
Hansjoerg Stern,
by Louis A. Moucha

FLUIDIC GAGING DEVICE

This application is a continuation of U.S. application Ser. No. 800,623, filed Feb. 19, 1969 in the name of Hansjoerg Stern and entitled "Fluidic Gaging Device" now abandoned.

My invention relates to a fluidic gage having no moving mechanical parts, and in particular, a gage adapted for continuous monitoring of a particular parameter such as wire diameter, sliver density, object proximity and the like.

Pneumatic gaging has been known for many years and is based on the pressure changes accompanying the escape of pressurized fluid through a variable constriction. The variable constriction conventionally comprises a fixed constrictor the size of which is influenced or made variable by a particular variable parameter of a material being measured or monitored by the gage.

Prior art pneumatic gages have suffered from the lack of high accuracy and speed of response, and at best, have been useful for obtaining only coarse measurements. The recent development of fluidic resistors and fluid amplifiers having no moving mechanical parts provides useful devices for obtaining a much higher degree of accuracy of measurement or monitoring than previously obtainable.

Therefore, one of the principal objects of my invention is to provide an improved fluidic gage which attains a high degree of measurement accuracy and has a high speed of response.

Another object of my invention is to provide the gage with no moving mechanical parts to thereby obtain an extremely reliable device.

A still further object of my invention is to provide an improved fluidic gage utilizing a bridge circuit of fluidic resistors and a sensing element which functions as a variable resistor to obtain a very sensitive error-sensing circuit.

Another object of my invention is to provide single or multi-stage fluid amplifiers having no moving mechanical parts connected to the output of the bridge circuit for operating suitable readout devices or initiating control action.

In accordance with the objects of my invention, I provide a fluidic gage having no moving mechanical parts and including an error-sensing circuit comprising a bridge circuit of two fluid fixed resistors and two fluidic variable resistors. The first variable resistor is preset to a fluid flow resistance corresponding to a desired value of a particular parameter being continuously monitored by the gage. The second variable resistor is a sensing head in fluid communication with a selected material being monitored by the gage, the sensing head functioning as a variable resistor due to its fluid flow resistance varying as a function of the monitored parameter. A deviation in the parameter from the desired level causes a linear pressure unbalance across the bridge circuit and the resulting fluid pressure signal may be utilized directly to operate a readout device or may be amplified by one or multi-stages of fluid amplifiers to initiate a control action in an open or closed loop control system.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawing wherein like parts in each of the several figures are identified by the same reference character and wherein:

FIG. 1 is a schematic representation of the fluidic gage constructed in accordance with my invention;

FIG. 2 is a front view of my fluidic gage for measuring wire diameter; FIG. 2a is an enlarged view of the sensing head component; and FIGS. 3a, 3b, 3c, 3d and 3e illustrate sectional views of five other embodiments of a sensing head which may be utilized in my fluidig gage.

Referring now in particular to FIGS. 1 and 2, there are shown a schematic view and a front view of a model of my fluidic gage, respectively. The essential component of my gage comprises a sensing circuit for developing a pressurized fluid signal representing a deviation from a reference or desired value of a particular parameter being monitored by my gage. Typical parameters which may be continuously monitored and even quantitatively measured by my fluidic gage are wire diameter, sliver density, object proximity including out-of-roundness of a cylindrical body and the like. The sensing circuit comprises a bridge circuit identified as a whole by numeral 10 and includes a pair of fluidic resistors 11, 12 having fixed resistances to fluid flow therethrough and connected in the first two legs of the bridge. Fluidic resistors 11, 12 each comprise long capillary passages or predetermined length. For most applications, the dimensions of these capillary passages are equal such that resistors 11 and 12 exhibit equal resistance values, however, in certain cases to be described hereinafter, the capillary passages may be of unequal dimension to obtain a selected ratio of these resistances. Resistors 11 and 12 have first ends thereof connected to a first bridge juncture 10a which is supplied with pressurized fluid from a suitable pressurized fluid source P.

A fluidic resistor means 13 having a variable but presettable resistance to fluid flow therethrough is connected in the third leg of the bridge circuit, and a first or input end thereof is connected to the second end of fixed resistor 12 at second bridge juncture 10b. Variable resistor means 13 may be of the laminar type described and claimed in U.S. Pat. No. 3,532,127, issued Oct. 6, 1970, entitled "Variable Fluidic Resistor Device," inventors Vogelsang et al. and assigned to the assignee of the present invention; or of the orifice or needle valve type which more nearly matches the resistance type of the sharp orifice sensing head to be described and thereby minimizes the effect of temperature variations. Fixed resistors 11, 12 may conveniently be formed in a single laminated structure 26 which is similar to that of resistor 13. Alternatively, resistor 13 may be a reference sensing head to be described hereinafter. In the first case, resistor 13 also comprises a long capillary passage, but is provided with means for varying the length thereof to thereby obtain predetermined values of flow resistance. The second or output end of resistor means 13 is suitably vented (to atmosphere in the case wherein the fluid medium employed is a gas, to a sump for fluid return in the case of a liquid medium) and the vent is considered the third juncture 10c of the bridge circuit. It should be recognized that my fluidic gage is operable as a pneumatic or hydraulic device with the exception of the FIG. 3e embodiment of the sensing head which is limited to pneumatic application. The pneumatic medium may be any compatible gas including air, and the hydraulic medium any compatible liquid.

The fourth leg of the bridge circuit includes the sensing element 14 (sensing head) of my fluidic gage device and functions as a second fluidic variable resistor 14 comprising two variable resistors in parallel. The first (input) ends of resistors 14 are connected to the second end of fixed resistor 11 at fourth bridge juncture 10d and the second (output) ends of resistors 14 are vented at juncture 10c. Bridge junctures 10a, 10b and 10d correspond to suitable fluid couplings 10a, 10b, 10d in FIG. 2. The interconnections of the various elements hereinabove, and hereinafter described, comprise suitable tubing of the flexible type such as plastic, or of the nonflexible type such as copper and the like. The particular choice of tubing material depends upon several factors including the gage operation environment and material cost.

The sensing head 14 is illustrated, partly in section, in a simple embodiment for monitoring diameter of wire, thread material, and the like, in FIGS. 2, 2a and comprises a cylindrical body 14a having a hollow, cylindrical interior 20 coaxial with the longitudinal axis of the body. The outer surface of the body may be of any form, but the hollow interior surface should conform to the cross-sectional shape of the material 21 being monitored. The body 14a is fabricated of a rigid material such as metal, plastic or the like. The material of body 14a need not be of the high strength type since the wire, thread, or other relatively dense, elongated material 21 passing through the hollow interior 20 should not contact the side walls thereof and therefore no wearing thereof should occur. Guide members 22 are mounted on my gage in alignment with sensing head 14 for centering the material 21 passing therethrough to thereby reduce the possibility of the material contacting the inner side walls thereof.

Pressurized fluid is supplied to the hollow interior 20 of body 14a by means of a suitable passage 23 formed radially through one side wall of body 14a and spaced equally from both ends thereof. The input end of passage 23 is provided with a fitting and connected through suitable tubing 24 to coupling 10d corresponding to bridge juncture 10d in FIG. 1. Thus, pressurized fluid upon passage through resistor 11 flows through passage 23 and issues into the hollow interior 20 centrally thereof, and is then distributed substantially equally between the two ends thereof, escaping through the variable constrictions formed by the fixed dimensions at the ends of hollow interior 20 and the possibly variable dimensions of monitored material 21 passing therethrough as indicated by the arrowhead.

The hollow interior 20 may have a sufficiently small diameter (or small cross-sectional area in the case of noncircular cross section) to function as a nozzle constriction having a predetermined area in cross section which is influenced, and thus varied, by the cross section dimension of the monitored material 21 passing therethrough. Alternatively, and preferably, annular sharp edged orifices 25 are suitably mounted in alignment at both ends of hollow interior 20 to assure a non-laminar flow of the escaping fluid. The nonlaminar flow eliminates measurement errors which are introduced due to noncentering of material 21 in its passage through the sensing head. The use of the sharp edged orifices permits hollow interior 20 to be of a greater cross sectional dimension since its primary purpose is then not to be a constriction but merely a flow passage.

The specific embodiment of my fluidic gage illustrated in FIG. 2 utilizes a gaseous fluid medium and variable resistor 13 and the sensing head vent to the atmosphere. The directions of fluid flows in the various interconnecting tubings are indicated by the arrowheads therein.

The output of the bridge circuit is across junctures 10b and 10d. For many applications, the resistance values of fixed resistors 11 and 12 are equal, and the reference resistance value of variable resistor 13 is approximately one-half of the pressure of the fluid supplied to the bridge circuit is distributed across each resistor. However, in cases wherein a somewhat greater standard diameter material 21 is monitored, my gage is operable by merely increasing the resistance of variable reference resistor 13 and under such circumstances less than one half of the supply pressure will be dropped across each of equal fixed resistors 11, 12. Finally, in the case wherein the standard diameter of material 21 is increased beyond the maximum resistance of resistor 13, fixed resistor 11 can be interchanged for a larger fixed resistor such that the ratio $(R_{12}/R_{13})$ $(R_{11}/R_{14})$ is maintained.

The bridge circuit of my gage operates in the following manner. In the case wherein a particular parameter being monitored is at the desired value, the effective resistance presented by sensing head 14 is equal to the preset resistance of reference resistor 13 such that the pressure magnitudes at output junctures 10b and 10d are equal and there is, therefore, no unbalance in the bridge circuit. Under this condition of bridge balance, no net output signal is developed across junctures 10b and 10d. In the example of the particular parameter being a wire diameter as indicated in FIGS. 2, 3a and 3d, and assuming the wire diameter becoming greater than the desired value, the rate of escape of pressurized fluid through the variable constriction at the ends of the sensing head becomes less than when the diameter is at the desired value, causing an increase in the pressure at juncture 10d. The converse is true for an undersized diameter, causing a pressure decrease at juncture 10d. Sensing head 14 thus operates as a variable resistor wherein the resistance value varies directly with the magnitude of the parameter being measured. The presence of an oversized material passing through the sensing head is indicated by a net differential pressure across junctures 10b and 10d wherein the pressure at 10d is greater than the pressure at 10b and vice versa for the case of undersized material. The pressure signal developed across junctures 10b, 10d varies linearly with deviation in the monitored parameter from the desired value over the range of interest for the particular application. A zero center pressure gage 15 may be connected across junctures 10b and 10d of the bridge circuit for providing a visual indication of the state of the monitored parameter. The gage may be calibrated in units of the monitored parameter to obtain a quantitative measurement thereof. Obviously, any other type of pressure-sensitive readout means or device such as a pressure-sensitive switch wherein the movable contact closes an electrical circuit to a warning device such as a bell, etc., may be utilized.

The bridge circuit 10 and pressure gage 15 may be adequate as a fluidic gage for some applications, but many applications require a higher precision of measurement which permits detection of parameter changes of less than 1 percent of the reference value and a faster speed of response. One or more fluid amplifiers 16 of the proportional type having no moving mechanical parts are generally required to amplify the pressure signal across junctures 10b and 10d to provide a useful output signal $P_o$ since the pressure signal developed across the junctures for a diameter gaging application may be in the order of 0.1 pounds per square inch (psi) for a diameter change of 0.0005 inch. A convenient proportional fluid amplifier component 16 is the gain block described in U.S. Pat. No. 3,534,755, issued Oct. 20, 1970, entitled "High Signal-to-Noise Fluid Amplifier and Fluidic Components," inventor Thomas F. Urbanosky and assigned to the assignee of the present invention, or in the case wherein it is desired to obtain an output signal which is relatively independent of power fluid supply pressure variation, the fluidic operational amplifier described and claimed in the aforesaid U.S. Pat. No. 3,534,755 may be utilized. The fluidic operational amplifier has the further advantage of providing a more stable null point than the gain block which has no feedback and therefore a much higher gain. The output of the gain block or operational amplifier may then be used for further processing in a control system regulating the diameter of the monitored material, for actuating a larger readout device. The speed of response of the bridge circuit alone would be sufficiently slow as to produce a very slow control system, whereas the addition of the amplifiers (having a very high input impedance compared to the sensing head, and low output impedance) obtains a high frequency response to the entire system and thereby provides the gage with a fast speed of response enabling it to be used in a high speed continuous measuring process.

For many applications, it may be desired to provide a means for controlling the fluid supply pressure $P_s$ applied to the bridge circuit. This pressure control may comprise a valve which is manually operated or an automatic pressure regulator 17 connected between bridge juncture 10a and the fluid supply P. A suitable pressure gage 18 is preferably connected at the output of the pressure regulator for indicating the magnitude of the bridge input supply pressure $P_s$. The pressure $P_s$ is also supplied to the power fluid supply input of the fluid amplifier circuitry 16 by means of tubing 28 illustrated in FIG. 2.

A typical example of my fluidic gage operable as a wire gage has the following characteristics: the sides of the enclosure 29 illustrated in FIG. 2 are approximately 3 × 4 × 5 inches, the operating pressure $P_s$ is a maximum of 15 psig for the fluid amplifier circuitry although it can be in the range of 1 to 50 psig for the bridge circuit, the gage fluid flow rate is approximately 0.5 standardized cubic feed per minute, the output pressure $P_o$ is a maximum of approximately 10 psid, the time response to the gage is approximately 2 milliseconds through the gage and is a function of the speed of the wire passing through the sensing head, the sensing head has a length of ⅜ inch and outside diameter of ¼ inch, a minimum diameter of wire passing through the sensing head is approximately 0.0025 inch and there is no maximum diameter which is governed primarily by detectable fluid flow through the sensing head, the inner diameter of the sharp edged orifices in the sensing head is approximately 1.2 times the wire reference diameter, the maximum speed of wire passing through the sensing head in feet per second is length of the incorrect diameter in feet/0.002, the maximum length of tubing 24 from the sensing head to coupling 10d is 1 foot, and the sensitivity of the gage in its ability to detect diameter changes ± 3 percent of a 0.0025 inch reference diameter wire. The above characteristics are not to be construed as a limitation of my invention, and it should especially be noted that the sensitivity and accuracy increases with increased reference wire diameter.

The sensing head 14 illustrated in the FIG. 2 embodiment is useful for monitoring the diameter of a material having only a small range of reference diameters. A sensing head having interchangeable elements for monitoring a greater range of reference diameters is illustrated in FIG. 3a wherein the sensing head is constructed of four separate elements consisting of main body member 30, first end member 31, second end member 32 and inlet passage member 33. Main body member 30 has an outer cylindrical surface (which again may take other forms) and a hollow interior which includes a cylindrical central portion (assuming material 21 is of circular cross section) along approximately ¾ of the length of member 30, and the two aligned end portions of the hollow interior are preferably slightly enlarged and threaded for reception of end members 31 and 32. The central hollow interior of member 30 has a diameter substantially greater than the largest diameter material to be monitored by the gage, and, in general is several times such diameter. End members 31 and 32 are generally cylindrical in shape having the near portions of the outer surfaces threaded for engagement with the threads in member 30 and the far portions unthreaded and extending beyond the ends of member 30 for ease of screwing the end members. End members 31 and 32 may thus be unscrewed from member 30 and replaced by similar members having different diameter interiors when a significantly different diameter material is to be monitored. End members 31 and 32 have hollow concentric interiors of generally cylindrical shape and of diameter approximately 1.2 times the reference diameter of material 21 passing therethrough, in which case these hollow interiors function as the primary constriction for the pressurized fluid from bridge juncture 10d introduced through member 33 and escaping from the sensing head through the hollow interiors of end members 31 and 32 as indicated by the arrows. Since main body member 30 may be in the order of 1 inch in length, end members 31, 32 approach sharp edged orifices functionally. Alternatively, the outer ends of members 31, 32 may be provided with suitable annular sharp edged orifices as in the FIG. 2 embodiment. The left ends (as illustrated) of members 31 and 32 to which the monitored material 21 first approaches are preferably beveled, as illustrated, for aid of passage of the material should there be a slight misalignment of the sensing head. Inlet passage member 33 engages a side wall of member 30 and is disposed radially thereof and equally spaced from the ends thereof. Member 30 is provided with a radial passage centrally thereof and threaded along approximately half of the passage length. Member 33 is provided with a concentric hollow interior and a first portion of the outer surface of member 33 is threaded for engagement with the threaded portion of the radial passage in member 30 while a second portion is provided with a suitable fitting for tubing 24 having the other end thereof connected to coupling 10d. Member 33 is therefore also interchangeable with a like member having a different diameter hollow passage therethrough.

My fluidic gage may also be readily employed as an object proximity sensor or a distance gage. FIG. 3b illustrates the sensing head portion of my gage which accomplishes the latter two functions. For these particular applications, the sensing head comprises a single member 14 of generally cylindrical shape having a passage therethrough in the form of a hollow and preferably concentric cylindrical interior. A sharp edged orifice may be mounted near the outer edge of the bottom end of the sensing head, if desired. The bottom end surface of member 14 (as illustrated) is parallel to, and closely spaced from, the surface of a material 21a to be monitored. The direction of travel of material 21a is indicated by the arrowhead at the extreme right, as in all of the other embodiments. Material 21a is generally in the form of a sheet or other body having a relatively large surface area which is in fluid communication with the output (lower) end of sensing head 14. The upper (input) end of sensing head 14 is provided with a suitable fitting for connection to tubing 24 connected at its other end to coupling 10d.

Sensing head 14 in the FIG. 3b embodiment, when employed as a proximity sensor, circuit 16 preferably utilizes a fluidic Schmitt trigger circuit of the type manufactured by the General Electric Company, the circuit including a high gain proportional amplifier and staged digital fluid amplifiers. In the application of my fluidic proximity sensor in a conveyor belt system, the fluid amplifier circuitry 16 indicates by its suddenly switched output the presence of a body 21a on the conveyor belt passing by the output end of head 14. In the absence of a body on the conveyor belt, the pressure at juncture 10d is maintained at the pressure level of juncture 10b. Sensing head 14 must be spaced relatively close to the top surface of body 21a for developing the desired pressure signal at juncture 10d, a suitable distance being in the range up to 0.2 inches, or more generally, up to approximately ½ times the input passage diameter.

Sensing head 14 in the FIG. 3b embodiment when employed as a distance gage, utilizes proportional type fluid amplifiers in circuitry 16. The bottom surface of head 14 must be spaced within a fairly critical range from the top surface of a body or material 21a in order to detect small variations in the spacing $x$ therebetween. My fluidic distance gage is satisfactorily operable over a spacing range of 1/100 to ¼ times the diameter of the passage in head 14. In the case of a 0.003 inch diameter passage in sensing head 14, and a reference spacing of 0.00075 inch from the sensing head to the top of material 21a, my fluidic gage is capable of detecting variations in $x$ as small as 0.00004 inch.

The sensing head illustrated in FIG. 3b (and associated bridge circuit of FIG. 1) may also be employed to measure the out-of-roundness of a cylindrical or spherical body. The sensing head is again positioned a predetermined small distance $x$ from the surface of the body to be monitored, and upon rotation of the body, my gage (sensing head, bridge circuit 10 and fluid amplifier circuitry 16) detects any change in spacing $x$ corresponding to the out-of-roundness of the body. A preferred embodiment of sensing head 14 for measuring the out-of-roundness of body 21b is illustrated in FIG. 3c wherein the bottom surface of sensing head 14 is curved to conform to the curved surface of body 21b. This latter embodiment is preferred since the constriction formed between the bottom surface of the sensing head and the surface of body 21b is in the nature of a constant cross section nozzle as opposed to the divergent nozzle for a flat bottom surface sensing head.

Although the sensing heads of the FIGS. 2 and 3a embodiments when utilizing the sharp edge orifices hereinabove described obtain satisfactory performance of my fluidic gage for monitoring the diameter of wire, thread filaments, and the like, a long continued use of the gage would eventually result in wear of the orifice edges due to the material 21 occasionally coming into contact therewith. The use of guide members 22 does not eliminate the problem of orifice wear and for this reason the sensing head illustrated in FIG. 3d is a preferred embodiment since it further minimizes, and often completely eliminates, the wear of the orifice. It should be understood that the sensing head illustrated in FIG. 3d is also utilized with guide members 22. The sensing head as illustrated in the sectional side view of FIG. 3d (A) comprises a generally cylindrical main body member 40 and an inlet passage member 41, which may be the same type as member 33 in FIG. 3a, and is connected radially through a side wall of member 40 and spaced approximately equally from both ends thereof. Alternatively, the connection of members 41 and 40 may be a fixed connection as by soldering member 41 to member 40. Body member 40 is provided with a hollow interior which is cylindrical along approximately 80 percent of the surface of such hollow interior, the remaining 20 percent being an anvil-like member 42 supported by the bottom portion of member 40 and projecting into the interior thereof. Anvil member 42 extends longitudinally of member 40 along approximately 80 to 90 percent of the length thereof. The cross sectional outline of anvil member 42 is indicated in the sensing head end view of FIG. 3d (B). Again, as in the case of the FIG. 3a embodiment, the input (left) end of anvil member 42 is beveled for ease of admission of the wire, rod, thread or other material 21 passing through the sensing head. Sharp edged orifices 43 are suitably mounted adjacent the ends of body member 40, and in particular, orifices describing an arc of approximately 300° are located at the end positions of anvil member 42 (the input end of the anvil member being the part 42a where the bevel begins). Alternatively, the orifices can be 360° (annular) and mounted outside the end positions of anvil member 42, or mounted between two separate anvil members. The longitudinal position of anvil member 42 is not critical since the passage between the two orifices is much larger than the orifice area. The sensing head of FIG. 3d can also be made of interchangeable members by forming the outer ends of body member 40 (including the sharp edged orifices) as separate members which can be threaded into the central portion of body member 40. In the operation of the FIG. 3d sensing head, the monitored material 21 passes through the sensing head in slight contact with the upper concave-curved surface of anvil member 42 and thus the sharp edged orifices 43 are not subject to any wear due to their spacing therefrom. This latter embodiment does, of course, obtain physical contact between the material being monitored and the fluidic gage, (as distinguished from the previous embodiments) however, this physical contact is minimal and does not result in any additional tension or distortion of the material 21 passing through the sensing head. Finally, the sensing head in the FIG. 3d embodiment (as well as the other embodiments) may be of the split bushing type as indicated by lines 44 in end view FIG. 3d (B) for ease of initial threading of material 21 through the head. The split member 40 would be provided with a suitable seal such as an O-ring and could be retained by means of bolts or other known connecting devices.

The materials capable of being monitored in the above-described embodiments of my fluidic gage comprise relatively dense materials such as metallic wire and fiber threads. The embodiment of my sensing head illustrated in FIG. 3e is adapted for monitoring the density of less dense materials such as slivers and synthetic fiber yarns. The latter sensing head includes a relatively long, thin walled hollow cylindrical member 50 fabricated of thin tubing and having the ends thereof flared outward for ease of admission and exit of the low density material 21c through the sensing head. The inner diameter of tubing 50 is approximately ½ the diameter of the noncompressed, loosely packed fibrous material 21c monitored by my fluidic density gage to thereby sufficiently compress the material 21c to obtain a significant pressure signal therefrom. The tubing length should be at least 3 times the inner diameter of the tubing to obtain a sufficient resistance and also to increase the tensile strength of the material while passing through member 50. As opposed to the previous embodiments, my density sensing head utilizes two or more small tubular input passages 51 passing radially through the tubular side walls of member 50, centrally spaced from the ends thereof and equally spaced circumferentially around the tubing. Due to the generally small thickness of the wall of member 50, suitable fittings 51a are preferably soldered or welded onto corresponding entrance apertures formed through the wall of tubing 50 and appropriate tubings 51b are attached thereto. The tubings 51b may be fabricated of a flexible material such as plastic or rubber, or a nonflexible material such as copper, and are connected at the input ends thereof to a coupling 52 to which is supplied the pressured fluid from bridge juncture 10d.

As described in the embodiments hereinabove, my fluidic gage compares the variable fluid flow resistance of the sensing head with a selected reference resistance determined by resistor 13 in the bridge circuit. Resistor 13 need not be of the long capillary passage type described with reference to FIG. 2, but may comprise a second (reference) sensing head provided with a fixed length of the monitored material having the desired (reference) value of the monitored parameter and being retained in the sensing head to again function as a reference resistance. In this latter embodiment, the pressurized fluid input to the reference sensing head is supplied from juncture 10b. The reference sensing head is operatively identical to the first head 14 and may be of identical structure.

Having described several embodiments of my fluidic gage, it is believed obvious that modification and variation of my invention is possible in light of the above teachings. Thus, the sensing head may be fabricated as a single integral body which of course would limit it to the monitoring of only a small range of parameter values, or it may consist of several readily interchanged members. Also, various fluidic circuitry 16 which may include proportional, digital or combinations of proportional and digital type fluid amplifiers, may be utilized. Finally, the sensing head may be designed to measure other parameters than those described hereinabove by suitable adaption of the flow constriction portion of the sensing head to the material being monitored. It is, therefore, to be understood that changes may be made in the particular embodiments of my invention described which are within the full intended scope of the invention as defined by the following claims.

What I claim as new and desired to secure by Letters Patent of the United States is:

1. A fluidic gage having no moving mechanical parts for continuous monitoring of a particular parameter such as wire diameter, sliver density, object proximity and the like, comprising:
   a. a pair of fluidic resistors having fixed resistances to fluid flow therethrough;
   b. first fluidic resistor means having selected variable resistance to fluid flow therethrough;
   c. a first sensing head provided with at least one input fluid flow passage and output end means adapted to be in close proximity and in fluid communication with a selected material having a particular parameter being continuously monitored by said gage whereby said first sensing head functions as a second fluidic resistor having a resistance to fluid flow therethrough which is variable as a function of the value of the monitored parameter;
   d. said pair of fixed resistors, first variable resistor means and first sensing head connected in bridge circuit relationship, the bridge circuit connected to a source of pressurized fluid, the resistance of said first variable resistor means preset to a selected resistance corresponding to the desired value of the monitored parameter to obtain a balanced condition of the bridge circuit when the monitored parameter of the material passing in close proximity to and in fluid communication with said first sensing head is at the desired value thereof; the bridge circuit developing a pressurized fluid signal during the unbalanced conditions of the bridge circuit when the value of the monitored parameter deviates from the desired value;
   e. said pair of fixed resistors having first ends thereof connected to a first juncture of the bridge circuit;

f. the source of pressurized fluid connected to said first juncture;

g. an input end of said at least one input fluid flow passage of said first sensing head and a second end of a first of said pair of fixed resistors connected to a second juncture of the bridge circuit;

h. said pair of fixed resistors further comprising a single laminated structure of small dimension and each fixed resistor being a long capillary passage of predetermined length, the resistance values of each of the pair of fixed resistors being equal, the laminated resistor structure rendering said gage a portable device.

2. The fluidic gage set forth in claim 1 wherein:

a. a second end of a second of said pair of fixed resistors and an input end of said first variable resistor means are connected to a third juncture of the bridge circuit; and b. means is connected across the second and third junctures of the bridge circuit for further processing the fluid signal developed thereacross.

3. The fluidic gage set forth in claim 2 wherein said signal processing means comprises a fluid amplifier having no moving mechanical parts.

4. The fluidic gage set forth in claim 2 wherein said signal processing means comprises a read-out device for indicating unbalanced conditions of the bridge circuit.

5. The fluidic gage set forth in claim 2 wherein said signal processing means comprises a digital type fluid amplifier.

6. The fluidic gage set forth in claim 2 wherein said signal processing means comprises a proportional type fluid amplifier circuit having no moving mechanical parts for sufficiently amplifying the signal developed across the second and third junctures of the bridge circuit to detect deviations in the monitored parameter of very small order.

7. The fluidic gage set forth in claim 2 wherein the output end means of said first sensing head and an output end of said first variable resistor means are in communication with fluid vent means forming a fourth juncture of the bridge circuit.

8. The fluidic gage set forth in claim 2 wherein:

a. said first sensing head comprises a body having a cylindrical hollow interior forming said input fluid flow passage, a first end of the body being the input end of said input fluid flow passage supplied with pressurized fluid from the second juncture of the bridge circuit, a second end of the body being the output end means spaced a predetermined distance from the surface of a material whose proximity to the second end of the body is being measured; and b. a predetermined resistance value of said first variable resistor determines a desired proximity distance between the second end of the body and the material being monitored whereby any deviation in the spacing thereof from the desired value causes an unbalanced pressure condition in the bridge circuit and develops a pressurized fluid signal indicative thereof.

9. The fluidic gage set forth in claim 8 wherein the second end of said body of said first sensing head has a curved surface conforming to the curved surface of the material being monitored wherein the material is of cylindrical or spherical shape whereby the gage functions as an out-of-roundness gage determining the out-of-roundness of the cylindrical or spherical shaped material.

10. The fluidic gage set forth in claim 2 wherein:

a. said first sensing head comprises a relatively long non-flexible tubing having a length equal to at least 3 times the inner diameter thereof and forming said output end means, the tubing providing a passage for a low density fibrous material being monitored by said gage and having a diameter greater than the inner diameter of said tubing whereby the material is compressed in its passage therethrough; and b. said at least one input fluid flow passage comprises a pair of passages supplied at the input ends thereof with pressurized fluid from the second juncture of the bridge circuit and the output ends thereof in communication with the interior of said tubing in diametrically opposed relationship at a region spaced equally from the ends thereof whereby the pressurized fluid issuing into the interior of said tubing from said pair of passages escapes through the ends of said tubing, said tubing and material passing therethrough forming a variable constriction to fluid flow due to the variable density of the material, the variable constriction forming variable resistance to fluid flow therethrough and causing the fluid pressure at the second juncture of the bridge circuit to vary directly with the density of the monitored material.

11. The fluidic gage set forth in claim 2 wherein:

a. the output end means of said first sensing head comprises a first body having a cylindrical hollow interior providing a passage for the selected material being monitored by said fluidic gage; and b. said at least one input flow passage of said first sensing head comprises a second hollow body having a threaded output end adapted for fluid-tight connection with a radially formed threaded aperture in a sidewall of said first body spaced equally from the ends thereof to obtain fluid communication with the hollow interior of said first body whereby pressurized fluid supplied to the input end of said second hollow body from the second juncture of the bridge circuit issues into the hollow interior of said first body and escapes through the ends thereof which form variable constrictions formed by fixed dimensions of the ends of the hollow interior and the variable diameter dimensions of the selected material passing therethrough, the variable constrictions forming variable resistances to fluid flow therethrough and causing the fluid pressure at the second juncture of the bridge circuit to vary directly with the diameter of the monitored material, said second body due to the threaded connection being readily interchangeable with like bodies of different diameter passages therethrough for operation at significantly different input pressures, for utilization with significantly different diameter materials passing through said first body, and the like.

12. The fluidic gage set forth in claim 11 wherein the output end means of said first sensing head further comprises a pair of sharp edged orifices mounted adjacent the ends of the hollow interior of said first body to thereby obtain a non-laminar flow of the escaping pressurized fluid.

13. The fluidic gage set forth in claim 11 wherein the output end means of said first sensing head further comprises a pair of threaded third bodies adapted for fluidic-tight connection at like threaded ends of the hollow interior of said first body and having narrow cylindrical passages therethrough aligned with the hollow interior of said first body for providing a passage for the material being monitored and thereby forming the variable constrictions to the escaping pressurized fluid, said pair of third bodies being interchangeable with like bodies of different diameter cylindrical passages therethrough for utilization with significantly different diameter materials passing therethrough.

14. The fluidic gage set forth in claim 13 wherein said pair of third bodies are provided with beveled openings at the ends of the narrow cylindrical passages which the monitored material first approaches.

15. A fluidic gage having no moving mechanical parts for continuous monitoring of a particular parameter such as wire diameter, sliver density, object proximity and the like, comprising:
   a. a pair of fluidic resistors having fixed resistances to fluid flow therethrough;
   b. first fluidic resistor means having selected variable resistance to fluid flow therethrough;
   c. a first sensing head provided with at least one input fluid flow passage and output end means adapted to be in close proximity and in fluid communication with a selected material having a particular parameter being continuously monitored by said gage whereby said first sensing head functions as a second fluidic resistor having a resistance to fluid flow therethrough which is variable as a function of the value of the monitored parameter;
   d. said pair of fixed resistors, first variable resistor means and first sensing head connected in bridge circuit relationship, the bridge circuit connected to a source of pressurized fluid, the resistance of said first variable resistor means preset to a selected resistance corresponding to the desired value of the monitored parameter to obtain a balanced condition of the bridge circuit when the monitored parameter of the material passing in close proximity to and in fluid communication with said first sensing head is at the desired value thereof, the bridge circuit developing a pressurized fluid signal during the unbalanced conditions of the bridge circuit when the value of the monitored parameter deviates from the desired value;
   e. said pair of fixed resistors having first ends thereof connected to a first juncture of the bridge circuit;
   f. the source of pressurized fluid connected to said first juncture;
   g. an input end of said at least one input fluid flow passage of said first sensing head and a second end of a first of said pair of fixed resistors connected to a second juncture of the bridge circuit;
   h. said pair of fixed resistors further comprising a single laminated structure of small dimension and each fixed resistor being a long capillary passage of predetermined length, the resistance values of the pair of fixed resistors being unequal, the laminated resistor structure rendering said gage a portable device.

16. The fluidic gage set forth in claim 15 wherein:
   a. a second end of a second of said pair of fixed resistors and an input end of said first variable resistor means are connected to a third juncture of the bridge circuit; and
   b. means is connected across the second and third junctures of the bridge circuit for further processing the fluid signal developed thereacross.

17. The fluidic gage set forth in claim 16 wherein said signal processing means comprises a fluid amplifier having no moving mechanical parts.

18. The fluidic gage set forth in claim 16 wherein said signal processing means comprises a read-out device for indicating unbalanced conditions of the bridge circuit.

19. The fluidic gage set forth in claim 16 wherein said signal processing means comprises a digital type fluid amplifier.

20. The fluidic gage set forth in claim 16 wherein said signal processing means comprises a proportional type fluid amplifier circuit having no moving mechanical parts for sufficiently amplifying the signal developed across the second and third junctures of the bridge circuit to detect deviations in the monitored parameter of very small order.

21. The fluidic gage set forth in claim 16 wherein the output end means of said first sensing head and an output end of said first variable resistor means are in communication with fluid vent means forming a fourth juncture of the bridge circuit.

22. The fluidic gage set forth in claim 16 wherein:
   a. said first sensing head comprises a body having a cylindrical hollow interior forming said input fluid flow passage, a first end of the body being the input end of said input fluid flow passage supplied with pressurized fluid from the second juncture of the bridge circuit, a second end of the body being the output end means spaced a predetermined distance from the surface of a material whose proximity to the second end of the body is being measured; and
   b. a predetermined resistance value of said first variable resistor determines a desired proximity distance between the second end of the body and the material being monitored whereby any deviation in the spacing thereof from the desired value causes an unbalanced pressure condition in the bridge circuit and develops a pressurized fluid signal indicative thereof.

23. The fluidic gage set forth in claim 22 wherein the second end of said body of said first sensing head has a curved surface conforming to the curved surface of the material being monitored wherein the material is of cylindrical or spherical shape whereby the gage functions as an out-of-roundness gage determining the out-of-roundness of the cylindrical or spherical shaped material 24. The fluidic gage set forth in claim 16 wherein:
   a. said first sensing head comprises a relatively long non-flexible tubing having a length equal to at least 3 times the inner diameter thereof and forming said output end means, the tubing providing a passage for a low density fibrous material being monitored by said gage and having a diameter greater than the inner diameter of said tubing whereby the material is compressed in its passage therethrough; and b. said at least one input fluid flow passage comprises a pair of passages supplied at the input ends thereof with pressurized fluid from the second juncture of the bridge circuit and the output ends thereof in communication with the interior of said tubing in diametrically opposed relationship at a region spaced equally from the ends thereof whereby the pressurized fluid issuing into the interior of said tubing from said pair of passages escapes through the ends of said tubing, said tubing and material passing therethrough forming a variable constriction to fluid flow due to the variable density of the material, the variable constriction forming variable resistance to fluid flow therethrough and causing the fluid pressure at the second juncture of the bridge circuit to vary directly with the density of the monitored material.

25. The fluidic gage set forth in claim 16 wherein:
a. the output end means of said first sensing head comprises a first body having a cylindrical hollow interior providing a passage for the selected material being monitored by said fluidic gage; and
b. said at least one input flow passage of said first sensing head comprises a second hollow body having a threaded output end adapted for fluid-tight connection with a radially formed threaded aperture in a sidewall of said first body spaced equally from the ends thereof to obtain fluid communication with the hollow interior of said first body whereby pressurized fluid supplied to the input end of said second hollow body from the second juncture of the bridge circuit issues into the hollow interior of said first body and escapes through the ends thereof which form variable constrictions formed by fixed dimensions of the ends of the hollow interior and the variable diameter dimensions of the selected material passing therethrough, the variable constrictions forming variable resistances to fluid flow therethrough and causing the fluid pressure at the second juncture of the bridge circuit to vary directly with the diameter of the monitored material, said second body due to the threaded connection being readily interchangeable with like bodies of different diameter passages therethrough for operation at significantly different input pressures, for utilization with significantly different diameter materials passing through said first body, and the like.

26. The fluidic gage set forth in claim 25 wherein the output end means of said first sensing head further comprises a pair of sharp edged orifices mounted adjacent the ends of the hollow interior of said first body to thereby obtain a non-laminar flow of the escaping pressurized fluid.

27. The fluidic gage set forth in claim 25 wherein the output end means of said first sensing head further comprises a pair of threaded third bodies adapted for fluidic-tight connection at like threaded ends of the hollow interior of said first body and having narrow cylindrical passages therethrough aligned with the hollow interior of said first body for providing a passage for the material being monitored and thereby forming the variable constrictions to the escaping pressurized fluid, said pair of third bodies being interchangeable with like bodies of different diameter cylindrical passages therethrough for utilization with significantly different diameter materials passing therethrough.

28. The fluidic gage set forth in claim 27 wherein said pair of third bodies are provided with beveled openings at the ends of the narrow cylindrical passages which the monitored material first approaches.

29. A fluidic gage having no moving mechanical parts for continuous monitoring of a particular parameter such as wire diameter, sliver density, object proximity and the like, comprising:
a. a pair of fluidic resistors having fixed resistances to fluid flow therethrough;
b. first fluidic resistor means having selected variable resistance to fluid flow therethrough;
c. a first sensing head provided with at least one input fluid flow passage and output end means adapted to be in close proximity and in fluid communication with a selected material having a particular parameter being continuously monitored by said gage whereby said first sensing head functions as a second fluidic resistor having a resistance to fluid flow therethrough which is variable as a function of the value of the monitored parameter;
d. said pair of fixed resistors, first variable resistor means and first sensing head connected in bridge circuit relationship, the bridge circuit connected to a source of pressurized fluid, the resistance of said first variable resistor means preset to a selected resistance corresponding to the desired value of the monitored parameter to obtain a balanced condition of the bridge circuit when the monitored parameter of the material passing in close proximity to and in fluid communication with said first sensing head is at the desired value thereof, the bridge circuit developing a pressurized fluid signal during the unbalanced conditions of the bridge circuit when the value of the monitored parameter deviates from the desired value;
e. said first variable resistor means comprising a second sensing head operatively identical to said first sensing head and adapted to be in close proximity and retained in fluid communication with a fixed portion of the selected material having the desired value of the monitored parameter whereby said second sensing head functions as a reference resistance to fluid flow therethrough corresponding to the desired value of the monitored parameter.

30. A fluidic gage having no moving mechanical parts for continuous monitoring of a particular parameter such as wire diameter, sliver density, object proximity and the like, comprising:
a. a pair of fluidic resistors having fixed resistances to fluid flow therethrough;
b. first fluidic resistor means having selected variable resistance to fluid flow therethrough;
c. a first sensing head provided with at least one input fluid flow passage and output end means adapted to be in close proximity and in fluid communication with a selected material having a particular parameter being continuously monitored by said gage whereby said first sensing head functions as a second fluidic resistor having a resistance to fluid flow therethrough which is variable as a function of the value of the monitored parameter;

d. said pair of fixed resistors, first variable resistor means and first sensing head connected in bridge circuit relationship, the bridge circuit connected to a source of pressurized fluid, the resistance of said first variable resistor means preset to a selected resistance corresponding to the desired value of the monitored parameter to obtain a balanced condition of the bridge circuit when the monitored parameter of the material passing in close proximity to and in fluid communication with said first sensing head is at the desired value thereof, the bridge circuit developing a pressurized fluid signal during the unbalanced conditions of the bridge circuit when the value of the monitored parameter deviates from the desired value;

e. said pair of fixed resistors having first ends thereof connected to a first juncture of the bridge circuit;

f. the source of pressurized fluid connected to said first juncture;

g. an input end of said at least one input fluid flow passage of said first sensing head and a second end of a first of said pair of fixed resistors connected to a second juncture of the bridge circuit;

h. said first sensing head comprising a body having a cylindrical hollow interior forming said input fluid flow passage, a first end of the body being the input end of said input fluid flow passage supplied with pressurized fluid from the second juncture of the bridge circuit, a second end of the body being the output end means spaced a predetermined distance from the surface of a material whose proximity to the second end of the body is being measured;

i. the second end of the body having a curved surface conforming to the curved surface of the material being monitored wherein the material is of cylindrical or spherical shape whereby the gage functions as an out-of-roundness gage determining the out-of-roundness of the cylindrical or spherical shaped material, and j. a predetermined resistance value of said first variable resistor determining a desired proximity distance between the second end of the body and the material being monitored whereby any deviation in the spacing thereof from the desired value causes an unbalanced pressure condition in the bridge circuit and develops a pressurized fluid signal indicative thereof.

31. A fluidic gage having no moving mechanical parts for continuous monitoring of a particular parameter such as wire diameter, sliver density, object proximity and the like, comprising:

a. a pair of fluidic resistors having fixed resistances to fluid flow therethrough;

b. first fluidic resistor means having selected variable resistance to fluid flow therethrough;

c. a first sensing head provided with at least one input fluid flow passage and output end means adapted to be in close proximity and in fluid communication with a selected material having a particular parameter being continuously monitored by said gage whereby said first sensing head functions continuously monitored by said gage whereby said first sensing head functions as a second fluidic resistor having a resistance to fluid flow therethrough which is variable as a function of the value of the monitored parameter;

d. said pair of fixed resistors, first variable resistor means and first sensing head connected in bridge circuit relationship, the bridge circuit connected to a source of pressurized fluid, the resistance of said first variable resistor means preset to a selected resistance corresponding to the desired value of the monitored parameter to obtain a balanced condition of the bridge circuit when the monitored parameter of the material passing in close proximity to and in fluid communication with said first sensing head is at the desired value thereof, the bridge circuit developing a pressurized fluid signal during the unbalanced conditions of the bridge circuit when the value of the monitored parameter deviates from the desired value;

e. said pair of fixed resistors having first ends thereof connected to a first juncture of the bridge circuit;

f. the source of pressurized fluid connected to said fluid juncture;

g. an input end of said at least one input fluid flow passage of said first sensing head and a second end of a first of said pair of fixed resistors connected to a second juncture of the bridge circuit;

h. said first sensing head comprising a relatively long non-flexible tubing having a length equal to at least 3 times the inner diameter thereof and forming said output end means, the tubing providing a passage for a low density fibrous material being monitored by said gage and having a diameter greater than the inner diameter of said tubing whereby the material is compressed in its passage therethrough; and i. said at least one input fluid flow passage comprising a pair of passages supplied at the input ends thereof with pressurized fluid from the second juncture of the bridge circuit and the output ends thereof in communication with the interior of said tubing in diametrically opposed relationship at a region spaced equally from the ends thereof whereby the pressurized fluid issuing into the interior of said tubing from said pair of passages escapes through the ends of said tubing, said tubing and material passing therethrough forming a variable constriction to fluid flow due to the variable density of the material, the variable constriction forming variable resistance to fluid flow therethrough and causing the fluid pressure at the second juncture of the bridge circuit to vary directly with the density of the monitored material.

32. A fluidic gage having no moving mechanical parts for continuous monitoring of a particular parameter such as wire diameter, sliver density, object proximity and the like, comprising:

a. a pair of fluidic resistors having fixed resistances to fluid flow therethrough;

b. first fluidic resistor means having selected variable resistance to fluid flow therethrough;

c. a first sensing head provided with at least one input fluid flow passage and output end means adapted to be in close proximity and in fluid communication with a selected material having a particular parameter being continuously monitored by said gage whereby said first sensing head functions as a second fluidic resistor having a resistance to fluid flow therethrough which is variable as a function of the value of the monitored parameter;

d. said pair of fixed resistors, first variable resistor means and first sensing head connected in bridge circuit relationship, the bridge circuit connected to a source of pressurized fluid, the resistance of said first variable resistor means preset to a selected resistance corresponding to the desired value of the monitored parameter to obtain a balanced condition of the bridge circuit when the monitored parameter of the material passing in close proximity to and in fluid communication with said first sensing head is at the desired value thereof, the bridge circuit developing a pressurized fluid signal during the unbalanced conditions of the bridge circuit when the value of the monitored parameter deviates from the desired value;

e. said pair of fixed resistors having first ends thereof connected to a first juncture of the bridge circuit;

f. the source of pressurized fluid connected to said first juncture;

g. an input end of said at least one input fluid flow passage of said first sensing head and a second end of a first of said pair of fixed resistors connected to a second juncture of the bridge circuit;

h. the output end means of said first sensing head comprising a first body having a cylindrical hollow interior providing a passage for the selected material being monitored by said fluidic gage; and i. said at least one input fluid flow passage comprising a second hollow body having a threaded output end adapted for fluid-tight connection with a radially formed threaded aperture in a sidewall of said first body spaced equally from the ends thereof to obtain fluid communication with the hollow interior of said first body whereby pressurized fluid supplied to the input end of said second hollow body from the second juncture of the bridge circuit issues into the hollow interior of said first body and escapes through the ends thereof which form variable constrictions formed by fixed dimensions of the ends of the hollow interior and the variable diameter dimensions of the selected material passing therethrough, the variable constrictions forming variable resistances to fluid flow therethrough and causing the fluid pressure at the second juncture of the bridge circuit to vary directly with the diameter of the monitored material, said second body due to the threaded connection being readily interchangeable with like bodies of different diameter passages therethrough for operation at significantly different input pressures, for utilization with significantly different diameter materials passing through said first body, and the like.

33. The fluidic gage set forth in claim 32 wherein the output end means of said first sensing head further comprises a pair of sharp edged orifices mounted adjacent the ends of the hollow interior of said first body to thereby obtain a non-laminar flow of the escaping pressurized fluid.

34. The fluidic gage set forth in claim 32 wherein the output end means of said first sensing head further comprises a pair of threaded third bodies adapted for fluidic-tight connection at like threaded ends of the hollow interior of said first body and having narrow cylindrical passages therethrough aligned with the hollow interior of said first body for providing a passage for the material being monitored and thereby forming the variable constrictions to the escaping pressurized fluid, said pair of third bodies interchangeable with like bodies of different diameter cylindrical passages therethrough for utilization with significantly different diameter materials passing therethrough.

35. The fluidic gage set forth in claim 34 wherein said pair of third bodies are provided with beveled openings at the ends of the narrow cylindrical passages which the monitored material first approaches.

* * * * *